United States Patent [19]
Yamaguchi et al.

[11] Patent Number: 5,952,432
[45] Date of Patent: Sep. 14, 1999

[54] WATER-SOLUBLE POLYMER, MANUFACTURING METHOD THEREOF, AND DETERGENT COMPOSITION CONTAINING THE WATER-SOLUBLE POLYMER

[75] Inventors: Shigeru Yamaguchi; Yoshihiro Maeda; Hideyuki Nishibayashi, all of Himeji, Japan

[73] Assignee: Nippon Shokubai Co., Ltd., Osaka, Japan

[21] Appl. No.: 08/702,445

[22] PCT Filed: Feb. 2, 1996

[86] PCT No.: PCT/JP96/00222

§ 371 Date: Sep. 24, 1996

§ 102(e) Date: Sep. 24, 1996

[87] PCT Pub. No.: WO96/23822

PCT Pub. Date: Aug. 8, 1996

[30] Foreign Application Priority Data

Feb. 3, 1995 [JP] Japan .................................. 7-017044
Feb. 7, 1995 [JP] Japan .................................. 7-018904

[51] Int. Cl.$^6$ .............................. C11D 3/37; C23F 11/173
[52] U.S. Cl. .......................... 525/404; 510/434; 524/513; 525/403
[58] Field of Search ..................... 525/403, 404; 524/513; 510/434

[56] References Cited

U.S. PATENT DOCUMENTS

| | | | |
|---|---|---|---|
| 4,612,352 | 9/1986 | Schäfer et al. ................... | 525/404 |
| 5,318,719 | 6/1994 | Hughes et al. ..................... | 525/404 |
| 5,420,211 | 5/1995 | Hughes et al. ..................... | 525/404 |

FOREIGN PATENT DOCUMENTS

| | | |
|---|---|---|
| 0 429 307 A3 | 5/1991 | European Pat. Off. . |
| 0 639 592 A1 | 2/1995 | European Pat. Off. . |
| 59-62614 | 4/1984 | Japan . |
| 3-177406 | 8/1991 | Japan . |
| 4-79365 B2 | 12/1992 | Japan . |
| 6-86503 B2 | 11/1994 | Japan . |

*Primary Examiner*—Morton Foelak
*Attorney, Agent, or Firm*—Kubovcik & Kubovcik

[57] ABSTRACT

A water-soluble polymer is obtained by, for example, a polymerization reaction of a polyether compound with a number-average molecular weight of not less than 250 and not more than 1,900 containing at least 50 mole percent of ethylene oxide as a unit structure with 25 percent by weight to 40 percent by weight of a monomer component composed of 50 mole percent to 80 mole percent of ethylenically unsaturated monomer and 20 mole percent to 50 mole percent of ethylenically unsaturated dicarboxylic acid monomer. The described water-soluble polymer shows a specific optimal range of calcium ion capturing ability and anti-gelation properties. Furthermore, when adopting such water-soluble polymer as the detergent builder, significantly improved detergency and satisfactory performances can be obtained.

53 Claims, No Drawings

WATER-SOLUBLE POLYMER, MANUFACTURING METHOD THEREOF, AND DETERGENT COMPOSITION CONTAINING THE WATER-SOLUBLE POLYMER

FIELD OF THE INVENTION

The present invention relates to a water-soluble polymer obtained by carrying out a polymerization reaction of a polyether compound including, for example, ethylene oxide, etc., with an ethylenically unsaturated dicarboxylic monomer such as (meth)acrylic acid, etc., and an ethylenically unsaturated dicarboxylic acid monomer such as maleic acid, etc., and the manufacturing method of the same, and also relates to a detergent composition including the same.

BACKGROUND OF THE INVENTION

An attempt to perform a graft polymerization of (meth) acrylic acid with respect to a polyether compound has been made in various fields, such as polyurethane, etc. For example, (1) Japanese Laid-Open Patent Application No. 71710/1980 (Tokukaisho 55-71710) discloses a polymer obtained by a graft-polymerization reaction of acrylic acid with a polyoxyalkylene compound wherein the acrylic acid is used in an amount of 3 to 15 percent by weight with respect to the total amount, and the manufacturing method thereof. However, when the graft polymer obtained by the described method of the Gazette (1) is used as a detergent builder, dispersant such as an inorganic pigment, etc., a fiber treatment agent, etc., the amount of carboxylic group, i.e., the amount of carboxylic acid is small, and the anti-gelation properties are poor, and a calcium ion capturing ability is too low. For the described disadvantageous characteristics, the graft polymer obtained from the described method does not offer sufficient performances, or requires a significantly increased amount of the graft polymer in order to ensure satisfactory performance.

Here, the anti-gelation properties are shown by numerical values indicative of easiness in mixing a graft polymer with a surface active agent. The lower the values, the more superior the anti-gelation properties. Namely, low anti-gelation properties suggest that the graft polymer can be mixed with the surface active agent with ease without generating clod. On the other hand, the calcium ion capturing ability shows detergency (washing power) of a detergent composition containing the graft polymer by a numerical value ($mgCaCO_3/g$) obtained by converting an amount of calcium ion that is captured by 1 g of graft polymer into calcium carbonate. The higher the value, the more desirable is the detergency.

In the described manufacturing method, when a graft polymerization of a hydrophilic ethylenically unsaturated monomer in an amount of not less than 25 percent by weight with respect to the total amount is performed, a large amount of carboxylic acid is generated, i.e., the concentration is too high. Thus, when adopting such graft polymer for the aforementioned purposes, the anti-gelation properties are too low.

(2) Japanese Laid-Open Patent Application No. 62614/ 1984 (Tokukaisho 59-62614) discloses a polymer obtained by performing a graft polymerization of not less than 20 percent by weight of hydrophilic ethylenically unsaturated monomer based on the graft polymer with polyglycol ether having at least one hydrophobic group, and the manufacturing method thereof. For the described manufacturing method of the Gazette (2), a method of adopting a solvent such as water, toluene, etc., and a method of carrying out a reaction at 90° C. or below without using a solvent are known.

However, the method has a drawback of low grafting efficiency, and thus the resulting graft polymer contains many ungrafted polymers, thereby presenting the problem of poor anti-gelation properties. Therefore, when such graft polymer is used as the detergent builder, the dispersant such as the inorganic pigment, etc., sufficient performances cannot be obtained. On the other hand, when the graft polymer resulting from the described method is used as the detergent builder of the detergent composition in a liquid form, ungrafted polymer is separated.

(3) Japanese Laid-Open Patent Application No. 177406/ 1991 (Tokukaihei 3-177406) discloses the same graft polymer obtained by carrying out a graft polymerization in an aqueous solvent. However, the method of performing the graft polymerization in an aqueous solvent has a drawback of low grafting efficiency. Therefore, the polymers resulting from this method are mainly polycarboxylic acids which are not grafted, thereby presenting the problem of poor anti-gelation properties. Therefore, when the graft polymer resulting from the method of the Gazette (3) is used for the described purposes, desired performances cannot be obtained.

As described, the conventional techniques do not enable a graft polymer which shows a high grafting efficiency and contains small amounts of ungrafted polymer while showing a calcium ion capturing ability and a anti-gelation property in respective specially defined optimal ranges to be manufactured with ease. Namely, the conventional techniques do not enable a water-soluble polymer which shows significantly improved detergency and satisfactory performances, for example, as a detergent builder, to be manufactured with ease.

The present invention is achieved in the hope of finding a solution to the described problems associated with the conventional technique, and accordingly, an object of the present invention is to provide a water-soluble polymer having a calcium ion capturing ability in a specially defined optimal range and a anti-gelation property in a specially defined optimal range, that can be suitably used, for example, as a detergent builder by enabling a significantly improved detergency and satisfactory performances to be obtained, and also to provide a manufacturing method of such water-soluble polymer and a detergent composition containing the same.

DISCLOSURE OF THE INVENTION

Earnest researches have been made by the inventors of the present invention on a water-soluble polymer, a manufacturing method of the same and a detergent composition containing the same to achieve the above-mentioned object, and they have found that a water-soluble polymer obtained by, for example, a polymerization reaction of a polyether compound including ethylene oxide, etc., with a specific amount of an ethylenically unsaturated monomer such as (meth)acrylic acid and a specific amount of an ethylenically unsaturated dicarboxylic acid monomer such as maleic acid shows a specific optimal value range of calcium ion capturing ability and a specific optimal value range of anti-gelation property, and that a detergent builder of such water-soluble polymer shows significantly improved detergency and satisfactory performances. Furthermore, they have found that the detergent composition containing the water-soluble polymer shows excellent detergency, and succeeded in achieving the present invention.

Namely, in order to solve the above-mentioned problems, the water-soluble polymer of the present invention is characterized by being prepared by a polymerization reaction of a polyether compound with a number-average molecular weight of not less than 200 containing at least 50 mole percent of ethylene oxide as a unit structure with 5 to 25 percent by weight of a monomer component composed of 40 to 90 mole percent of ethylenically unsaturated monomer and 10 mole percent to 60 mole percent of ethylenically unsaturated dicarboxylic acid monomer.

In order to solve the above-mentioned problem, another water-soluble polymer is characterized by being prepared by a polymerization reaction of a polyether compound with a number-average molecular weight of not less than 250 and not more than 1,900 containing at least 80 mole percent of ethylene oxide as a unit structure with 25 to 40 percent by weight with respect to the polyether compound of a monomer component composed of 50 mole percent to 80 mole percent of ethylenically unsaturated monomer and 20 mole percent to 50 mole percent of an ethylenically unsaturated dicarboxylic acid monomer.

The present invention will be explained in more detail.

When the water-soluble polymer is obtained using 5 to 25 percent by weight of the monomer component with respect to the polyether compound (for convenience in explanations, the described condition is hereinafter referred to as the condition ①), it is preferable to adopt as the polyether compound polyalkylene glycol having a number-average molecular weight (Mn) of not less than 200 and not more than 20,000 containing not less than 50 mole percent of ethylene oxide, more preferably not less than 80 mole percent of ethylene oxide as a unit structure. Furthermore, polyalkylene glycol having a number-average molecular weight of not less than 200 and not more than 1,900 is more preferable as a still improved anti-gelation property can be achieved.

When the water-soluble polymer is obtained using 25 to 40 percent by weight of the monomer component with respect to the polyether compound (hereinafter referred to as the condition ②), it is preferable to adopt as the polyether compound, polyalkylene glycol having a number-average molecular weight of not less than 250 and not more than 1,900 containing not less than 80 mole percent of ethylene oxide as a unit structure.

The polyether compound may be obtained by the known polymerization method of ethylene oxide that starts with water or alcohol and also using other alkylene oxide, if necessary.

Examples of such alcohols include: primary alcohols with 1 to 22 carbon atoms such as methanol, ethanol, n-propanol, n-butanol, etc.; secondary alcohols with 3 to 18 carbon atoms; tertiary alcohol such as t-butanol; diols such as ethyleneglycol, diethyleneglycol, propanediol, butanediol, propyleneglycol, etc.; triols such as glycerin, trimethylolpropane, etc.; polyols such as sorbitol, and the like. However, the alcohol of the present invention is not limited to the above. Only one kind of the above-listed alcohol may be adopted, or two or more kinds thereof may be suitably mixed and adopted.

Other alkylene oxides which are copolymerizable with ethylene oxide (hereinafter simply referred to as alkylene oxide) are not particularly limited, but propyleneoxide and butylene oxide are especially preferable. Here, two or more kinds of alkylene oxide may be adopted. Under the condition ①, not less than 50 mole percent, preferably not less than 80 mole percent of alkylene oxide containing the ethylene oxide is required with respect to the unit structure of the polyether compound. Under the condition ②, not less than 80 mole percent of alkylene oxide containing the ethylene oxide is required with respect to the unit structure of polyether compound. If a total amount of alkylene oxide deviates from the described range, the grafting efficiency of the resulting water-soluble polymer, i.e., the graft polymer would be lowered.

Such polyether compound includes an ester compound obtained by an esterification of all or some of the hydroxyl groups of the polyether compound obtained by the described method with a compound such as aliphatic acid having 2 to 22 carbon atoms, dicarboxylic acid such as succinic acid, succinic anhydride, maleic acid, maleic anhydride, adipic acid, and the like.

Under the condition ①, the number-average molecular weight of the polyether compound is preferably in a range of not less than 200 and not more than 20,000, more preferably in a range of not less than 200 and not more than 6,000. It is the most preferable that the number-average molecular weight is in a range of not less than 200 and not more than 1,900 as a still improved anti-gelation property can be obtained. It is not preferable that the number-average molecular weight is less than 200, as an amount of the polyether compound which is not subject to graft polymerization increases. On the other hand, it is also not preferable that the number-average molecular weight is above 20,000 as the antigelation properties are lowered. The anti-gelation properties are shown by a numerical value indicative of easiness in mixing the water-soluble polymer with the surface active agent (to be described later). The lower the value for the anti-gelation properties, the more excellent are the anti-gelation properties, and the water soluble compound can be mixed with ease without generating clod. The measuring method of the anti-gelation properties will be described in detail in the below mentioned Examples.

Under the condition ②, the number-average molecular weight of the polyether compound is preferably in a range of not less than 250 and not more than 1,900, more preferably in a range of notless than 300 and not more than 1,500, and still more preferably in a range of not less than 400 and not more than 1,300. It is not preferable that the number-average molecular weight is less than 250 as the grafting efficiency is lowered, as well as the anti-gelation property. On the other hand, it is also not preferable that the number-average molecular weight is above 1,900, as the anti-gelation properties are lowered, and this causes a significant reduction in calcium ion capturing ability. The calcium ion capturing ability suggests that the detergency of the detergent composition (to be described later) containing the water-soluble polymer shown by a value ($mgCaCO_3/g$) and is indicative of an amount of the calcium ion captured by 1 g of water-soluble polymer based on calcium carbonate. The higher the value for the calcium ion capturing ability, the more excellent is the detergency. The measuring method of the calcium ion capturing ability will be described in detail in the below-mentioned Examples.

In order to obtain a water-soluble polymer under the condition ①, a monomer mixture composed of not less than 40 mole percent and not more than 90 mole percent of (meth)acrylic acid (ethylenically unsaturated monomer) and not less than 10 mole percent and not more than 60 mole percent of ethylenically unsaturated dicarboxylic acid monomer (hereinafter referred to as a dicarboxylic acid monomer) is used. Then, a graft-polymerization is performed using the described monomer component in an amount of not less than 5 percent by weight and less than 25 percent by weight, more preferably not less than 7 percent by weight and not more than 23 percent by weight, and still more preferably not less than 10 percent by weight and not more than 20 percent by weight. When less than 5 percent by weight of the monomer component is used, an amount of carboxylic acid of the resulting water-soluble polymer becomes too small, i.e., the concentration thereof becomes too low, and satisfactory properties cannot be obtained, for example, in its polymetallic ion chelation and dispersion cannot be obtained. On the other hand, it is also not preferable that not less than 25 percent by weight of the monomer component is used, as an amount of carboxylic acid of the resulting water-soluble polymer would be too large, i.e., the concentration thereof would be too high, which results in the lower anti-gelation properties.

It is also not preferable that the ratio of the dicarboxylic acid monomer to the monomer component is less than 10 mole percent, as a molecular-weight of a side chain portion of the resulting water-soluble monomer would be too high which causes the antigelation properties to be lowered. Namely, by using the dicarboxylic acid monomer in an amount of not less than 10 mole percent and not more than 60 percent by weight with respect to the polyether compound, a side chain portion of the water-soluble polymer can be controlled to have an appropriate molecular weight, thereby improving the anti-gelation properties. On the other hand, it is not preferable that the ratio of (meth)acrylic acid to the monomer component is less than 40 mole percent, as the efficiency of introducing the (meth)acrylic acid into the polyether compound of dicarboxylic acid monomer would be lowered, which causes the amount of residual dicarboxylic acid monomer to be increased.

In order to obtain a water-soluble polymer under the condition ②, a monomer component composed of not less than 50 mole percent and not more than 80 mole percent of (meth)acrylic acid and not less than 20 mole percent and not more than 50 mole percent of dicarboxylic acid monomer is used. Then, a graft-polymerization of the polyether compound is performed using, for example, the described monomer component in an amount of not less than 25 percent by weight and not more than 40 percent by weight. When the monomer component contains the acrylic acid in an amount of not less than 50 mole percent and not more than 80 mole percent, it is preferable to use the monomer component in an amount of not less than 25 percent by weight and not more than 30 percent by weight with respect to the polyether compound. It is not preferable to use the monomer component in an amount of less than 25 percent by weight because an amount of carboxylic acid of the resulting water-soluble polymer becomes too small, i.e., the concentration thereof is too low, resulting in unsatisfactory properties in its calcium ion capturing ability, dispersability, etc.

It is also not preferable that the ratio of the (meth)acrylic acid to the monomer component is less than 50 mole percent because the efficiency of introducing the dicarboxylic acid monomer into the polyether compound would be lowered, which causes the amount of residual dicarboxylic acid monomer to be increased, and the dispersability of the water-soluble polymer, etc., to be unsatisfactory. It is also not preferable that the ratio of (meth)acrylic acid in the monomer component is above 80 mole percent because the anti-gelation properties would be lowered. In consideration of the above, it is especially preferable to use the monomer component composed of (meth)acrylic acid in an amount of not less than 60 mole percent and not more than 75 mole percent and dicarboxylic acid monomer in an amount of not less than 25 mole percent and not more than 40 mole percent, because the calcium ion capturing ability and the anti-gelation properties of the water-soluble monomer can be optimized.

Examples of dicarboxylic acid monomer include: maleic acid, fumaric acid, maleic anhydride, alkyl maleate such as dimethyl maleate, diethyl maleate; alkyl fumarate such as dimethyl fumarate, diethyl fumarate, etc. Only one kind of the above-listed dicarboxylic acid monomer may be adopted, or two or more kinds thereof may be suitably mixed and adopted. Among the above-listed compounds, maleic acid, fumaric acid and maleic anhydride are especially preferable as a large amount of carboxylic acid of the water-soluble polymer is generated, i.e., the concentration thereof is high, and still improved calcium ion capturing ability and dispersability can be obtained.

For the dicarboxylic acid monomer, when at least one compound selected from the group consisting of maleic acid, fumaric acid and maleic anhydride is used, it is especially preferable to carry out the graft polymerization in the following manner: After not less than a half of the total amount of dicarboxylic acid monomer is mixed in the polyether compound beforehand, the mixture (residual monomer component) of the residual dicarboxylic acid monomer and (meth)acrylic acid and a polymerization initiator are added to the polyether compound to carry out the graft polymerization. When carrying out the polymerization reaction in the described manner, the ratio of introducing the dicarboxylic acid monomer in the polyether compound can be significantly improved. The reaction method will be described in detail later.

The graft polymerization of the polyether compound of the monomer component is performed in a presence of the polymerization initiator practically without using a solvent. Here, the polymerization initiator is not particularly limited, and known radical polymerization initiator may be used. However, organic peroxide is especially preferable.

Examples of such organic peroxide include: ketone peroxide such as methyl ethyl ketone peroxide, cyclohexanone peroxide; hydroperoxide such as t-butyl hydroperoxide, cumene hydroperoxide, diisopropylbenzene hydroperoxide, p-menthanehydro peroxide, 2-5-dimethylhexane-2'5-dihydroperoxide, 1,1,3,3-tetramethylbutyl hydroperoxide, etc.; dialkyl peroxide such as di-t-butyl peroxide, t-butyl t-butylcumylperoxide, dicumyl peroxide, α,α'-bis(t-butylperoxy)p-diisopropylbenzene, α,α'-bis(t-butyl peroxy) p-diisopropylhexyne; peroxyester such as t-butyl peroxyacetate, t-butyl peroxylaurate, t-butyl peroxybenzoate, di-t-butyl peroxyisophthalate, 2,5-dimethyl-2,5-di(benzoylperoxy) hexane, t-butyl peroxyisopropylcarbonate, etc.; peroxy ketal such as n-butyl-4,4-bis(t-butylperoxy)valerate, 2,2-bis(t-butylperoxy) butane, etc.; diacyl peroxide, such as dibenzoyl peroxide, etc.

Only one kind of the above-listed organic peroxide may be adopted, or two or more kinds thereof may be suitably mixed and adopted.

The polymerization initiator is added to the polyether compound together with the monomer component. However, it is permitted to add the polymerization initiator beforehand to the polyether compound at a start of the polymerization reaction. An amount of use of the polymerization initiator is not particularly limited. However, it is preferable to use it in an amount in a range of not less than 0.1 percent by weight to 15 percent by weight, and more preferably in a range of not less than 0.5 percent by weight and not more than 10 percent by weight. If the amount of use of the polymerization initiator deviates from the described range, the graft efficiency of the monomer component with respect to the polyether compound is lowered.

It is also preferable that the graft polymerization of the monomer component with respect to the polyether compound is carried out substantially without using a solvent. If an organic solvent such as water, alcohol, toluene, etc., is used, the grafting efficiency of the monomer component with respect to the polyether compound may be lowered. Therefore, if the solvent is used when adding the polymerization initiator or the monomer component, the amount of the solvent to be used should be reduced to a minimum, preferably in an amount of not more than 5 percent by weight with respect to the total amount (i.e., the total amount of solution) or remove the solvent added together with the polymerization initiator and the monomer component immediately from the reaction system.

The polymerization temperature is typically not less than 120° C., preferably in a range of not less than 130° C. and not more than 160° C. When the polymerization temperature is below 120° C., the grafting efficiency of the monomer component with respect to the polyether compound is lowered. Additionally, when the polymerization temperature exceeds 160° C., thermal decomposition of the polyether compound and the water-soluble polymer occurs. For the reaction time, one to two hours is normally sufficient, but is not particularly limited and may be suitably adjusted in consideration of a composition of the polyether compound and the monomer component, and a polymerization temperature. Additionally, it is preferable that the polymerization reaction is performed under an atmosphere of inactive gas such as nitrogen, etc.

At a start of the polymerization reaction, it is preferable that at least a part of the polyether compound is placed in the reaction system. It is also preferable that not less than a half of the dicarboxylic acid monomer is placed in the reaction system together with the polyether compound. In this case, a mixture (residual monomer component) of the residual dicarboxylic acid monomer and (meth)acrylic acid and a polymerization initiator are separately added dropwise to the polyether compound after heating the polyether compound to 120° C. or above while agitating the polyether compound. The described addition method is preferable especially in the case of adopting a compound of at least one kind selected from the group consisting of maleic acid, fumaric acid and maleic anhydride as the dicarboxylic acid monomer. It is not preferable to place all the amount of the monomer component or the polymerization initiator in the reaction system in the initial stage of polymerization because it would be difficult to control the polymerization reaction. For this reason, it is preferable to separately add at least a part of the monomer component and the polymerization initiator in the reaction system dropwise simultaneously.

Furthermore, in the case of placing a part of the polyether compound in the reaction system at a start of the polymerization reaction, it is preferable to add the residual polyether compound dropwise, for example, by mixing it with the monomer component and/or the polymerization initiator. The method of placing the polyether compound is not particularly limited.

The water-soluble polymer of the graft polymer is obtained by the described polymerization reaction. The water-soluble polymer may be used as a dispersant or an anti-scale agent by dissolving it in a solvent such as water or alcohol. Alternatively, the water-soluble polymer that includes a base added thereto may be used. Examples of such base include: monovalent metal salts such as sodium salt, potassium salt, etc.; divalent metal salts such as calcium salt, etc.; trivalent metal salts such as aluminum salt, etc.; organic amine salts such as ammonium salts, monoethanolamine, triethanolamine, etc. However, the base is not particularly limited. In the case of adding the base to the water-soluble polymer, it is preferable to use water as the solvent.

As the water-soluble polymer obtained under the condition ① shows appropriate value ranges for the number-average molecular weight and the amount (concentration) of the carboxylic acid, and thus the water-soluble polymer for various solid particles show excellent dispersability. Furthermore, the excellent properties of the water-soluble polymer in its grafting efficiency and anti-gelation properties enable it to be suitably mixed with the surface active agent to form a uniform solution without generating a precipitation, separation and clod. Therefore, the water-soluble polymer can be applied to a detergent composition in a liquid form. The water-soluble polyer is also excellent in its antigelation property (not more than 0.16), and this feature enables it to be mixed with the surface active agent, etc., with ease.

The water-soluble polymer obtained under the condition ② has anti-gelation properties of not more than 1.5, preferably not more than 1.0, still more preferably not more than 0.5, and most preferably in a range of not less than 0.1 and not more than 0.3. When the water-soluble polymer having the antigelation properties of above 1.5 is mixed in the tap water, etc., the solubility thereof may be lowered by an effect of the calcium ion. Therefore, when the water-soluble polymer having the anti-gelation properties of more than 1.5 is adopted as the detergent builder or the anti-scale agent, satisfactory performances cannot be obtained.

The water-soluble polymer of the present invention has a calcium ion capturing ability of not less than 40 mgCaCO$_3$/g and not more than 130 mgCaCO$_3$/g preferably not less than 60 mgCaCO$_3$/g and not more than 120 mgCaCO$_3$/g, and most preferably in a range of not less than 80 mgCaCO$_3$/g and not more than 115 mgCaCO$_3$/g. It is not preferable to adopt the water-soluble polymer having a calcium ion capturing ability of less than 40 mgCaCO$_3$/g as a dispersant such as a detergent builder, a fiber processing agent etc., because satisfactory performances cannot be obtained. It is also not preferable to adopt the water-soluble polymer having the calcium ion capturing ability of above 130 mgCaCO$_3$/g, because the anti-gelation properties are lowered.

The water-soluble polymer obtained under the condition ② has the calcium ion capturing ability and the anti-gelation properties in respective appropriate ranges. Therefore, when the water-soluble polymer is mixed in the detergent composition, for example, as the detergent builder, the excellent detergency of the detergent composition can be achieved.

The detergent composition in accordance with the present invention is composed of the water-soluble polymer and a surface active agent. The detergent composition may also include an enzyme if necessary. The mixed ratio of the water-soluble polymer to the detergent composition is preferably in a range of 0.1 percent by weight and 15 percent by weight, more preferably in a range of not less than 0.3 percent by weight and not less than 10 percent by weight, and most preferably in a range of not less than 0.5 percent by weight and not more than 5 percent by weight. The state of the detergent composition is not particularly limited, but those of a liquid form are preferable. The method of measuring the detergency of the detergent composition will be described in detail in the below-described Examples.

For such surface active agent of the present invention, an anionic surface active agent, a nonionic surface active agent, an amphoteric surface active agent, and a cationic surface active agent may be preferably used. Only one kind of the above-listed surface active agent may be adopted, or two or more kinds thereof may be suitably mixed and adopted.

Examples of the anionic surfactant are alkylbenzene sulfonate, alkyl ether sulfate, alkenyl ether sulfate, alkyl sulfate, alkenyl sulfate, α-olefin sulfonate, α-sulfo fatty acid, α-sulfo fatty acid ester, alkane sulfonate, salt of saturated or unsaturated fatty acid, alkyl ether carboxylate, alkenyl ether carboxylate, amino acid type surfactant, N-acylamino acid type surfactant, alkyl phosphate ester and a salt thereof, alkenyl phosphate and a salt thereof, etc.

Examples of the nonionic surfactant are polyoxyalkylene alkyl ether, polyoxyalkylene alkenyl ether, polyoxyethylene alkylphenyl ether, higher fatty acid alkanolamide and alkylene oxide-appended higher fatty acid alkanolamide, sucrose fatty acid ester, alkyl glycoside, glycerol fatty acid monoester, alkylamine oxide, etc. For the nonionic surface active agent alkoxylate of straight chain secondary alcohol is still more preferable.

Examples of the amphoteric surface active agent include: carboxylic or sulfobetaine amphoteric surface active agent, and the like. Examples of the cationic surface active agent include: quaternary ammonium salts, and the like.

The ratio of use of the surface active agent is usually in the range of from 5 to 70 percent by weight, preferably in the range of from 20 to 60 percent by weight with respect to the total weight of detergent composition. In the case of using the nonionic surface active agent, the ratio of the nonionic surface active agent to the surface active agent is preferably in a range of not less than 50 percent by weight, more preferably in a range of not less than 60 percent by weight, and most preferably in a range of not less than 70 percent by weight. When using the nonionic surface active agent in the described ratio, a still improved detergency of the detergent composition can be obtained, thereby achieving a still compact-size of the detergent composition. For example, in the case of adopting industrial-use of the detergent compositions, a measurement can be made in a simplified manner.

Examples of enzyme to be mixed in the detergent composition containing the detergent builder include: protease, lipase, cellulase, and the like. Especially, protease, alkalilipase, and alkalicellulase which show high activity in the alkali detergent are especially preferable. The content of the enzyme is preferably in the range of from 0.01 to 5 percent by weight with respect to the total weight of the detergent composition. If the content deviates from the range, the balance with the surface active agent would collapse, and the detergency of the detergent composition cannot be improved.

The detergent composition containing the detergent builder of the present invention may include: known alkali builder, chelate builder, anti-readhesion agent, fluorescent agent, bleaching agent, perfume, and zeolite, etc., when an occasion demands. Additionally, in the case of adopting the detergement composition in a liquid form, a solvent such as ethanol, etc., may be mixed therein.

Examples of the alkali builder include: silicate, carbonate, sulfate, and the like. Examples of chelate builder include: diglycolic acid, oxycarboxylate, ethylenediamine tetraacetic acid (EDTA), diethylenetriamine pentaacetic acid (DTPA), citric acid, and the like, if an occasion demands.

The water-soluble polymer in accordance with the present invention shows desirable performances as a detergent builder, and also shows desirable performances as a dispersant of an inorganic substance and an organic substance that are not easily dis-soluble in water, an anti-scale agent, a fiber processing agent, etc. Specifically, the water-soluble polymer in accordance with the present invention is suitably used as a dispersant of an inorganic pigment such as heavy or soft calcium carbonate or clay used in paper coating; water-slurry dispersants such as cement, coal, etc.; an antiscaling use water treatment agent (anti-scale agent) such as calcium carbonate, silica, zinc, etc., for use in a cooling water circulation system, a builder water circulation system, a seawater desalting unit, a pulp furnace kiln, a black liquor concentrating kiln, etc.; a fiber processing agent such as a auxiliary dying agent, an auxiliary anti-charging agent, etc.

Furthermore, a water-absorbent resin may be obtained by cross-linking the water-soluble polymer of the present invention using a crosslinking agent. The resulting water-soluble resin has a high grafting efficiency of the water-soluble polymer, and the insoluble content thereof is small. Additionally, as the water-soluble polymer of the present invention includes a polyether in a main chain, it is superior in salt resistance. The cross-linking treatment may be practiced by a known method, and is not particularly limited. However, it is preferable that the cross-linking process is performed by a reaction of carboxylic acid contained in the water-soluble polymer with the cross-linking agent. The crosslinking agent is not particularly limited.

As described, the water-soluble polymer in accordance with the present invention is obtained by a polymerization reaction of a specific polyether compound containing ethylene oxide, etc., with a specific amount of ethylenically unsaturated monomer such as (meth)acrylic acid and a specific amount of ethylenically unsaturated dicarboxylic monomer such as maleic acid, etc. The water-soluble polymer has a calcium ion capturing ability in a specific optimal value range and a anti-gelation property in a specific optimal value range. When the water-soluble polymer is used, for example, as the detergent builder, excellent detergency and satisfactory performances can be obtained. The detergent composition containing the water-soluble polymer shows excellent detergency.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments.

PREFERRED EMBODIMENT OF THE PRESENT INVENTION

Hereinafter, the detergent builder and the method of manufacturing the detergent builder of the present invention are illustrated by the following examples of some preferred embodiments in comparison with comparative examples not according to the undermentioned examples. In Examples 1 and 2, a water-soluble polymer was obtained under the condition ①, while in Examples 5 through 9, a watersoluble polymer was obtained under the condition ②.

EXAMPLE 1

In a glass reaction vessel equipped with a thermometer, a stirrer, a nitrogen introducing tube, and a reflux condenser, placed were 100 parts by weight of monomethoxy polyethylene glycol (polyether compound) with a number-average molecular weight of 1,100 and 10 parts by weight of maleic acid (dicarboxylic acid monomer) as a monomer component. Under an atmosphere of nitrogen, the contents in the reaction vessel were heated to 145° C. with stirring to melt and mix them in the reaction vessel.

While maintaining the temperature at 145° C.~147° C., 13 parts by weight of acrylic acid (ethylenically unsaturated monomer) as a monomer component and 1.2 parts by weight of di-t-butyl peroxide as a polymerization initiator was added to the contents dropwise successively and separately over two hours. Thereafter, the contents were further stirred over thirty minutes. Then, the contents were cooled off.

Thereafter, 48 percent by weight of sodium hydroxide aqueous solution was added as a base to the contents with stirring so that the contents showed a pH value of 7.5. As a result, a sodium salt of water-soluble polymer (hereinafter referred to as a water-soluble polymer sodium salt) was obtained in a form of an aqueous solution. Powdered sodium salt of water-soluble polymer was obtained, for example, by condensing the solution.

The anti-gelation properties of the resulting sodium salt of water-soluble polymer was evaluated in the below-mentioned manner.

(Measuring Method)

First, 25 percent by weight of water-soluble sodium salt polymer aqueous solution was prepared. Next, to 10 g of the aqueous solution, were added 10 g of zinc nitrate hexahydrate, 10 g of calcium chloride dihydrate and 10 g of ion exchange solution, to obtain 40 g of test solution.

Then, the test solution was sealed and placed still in a thermostat for 30 minutes at 80° C. to gel the test solution. Thereafter, using a Shimazu spectrophotometer (available from Shimazu Seisakusho Co., Ltd.), the test solution in a form of gel was placed in a quartz cell with a width of 1 cm, and UV rays having a wavelength of 380 nm were projected to observe the absorbance.

The anti-gelation properties was evaluated by the observed absorbance. As a result, the sodium salt of water-soluble polymer shows the anti-gelation properties of 0.148. The result obtained from this example is shown in Table 1. Here, the lower is the value for the anti-gelation properties, the more excellent is its anti-gelation properties.

EXAMPLE 2

In the reaction vessel used in Example 1, placed were 100 parts by weight of monomethoxy polyethylene glycol with a number-average molecular weight of 1,100 and 7 parts by weight of maleic acid. Under an atmosphere of nitrogen, the contents in the reaction vessel were heated to 145° C. with stirring to melt and mix them in the reaction vessel.

While maintaining the temperature at 145° C.~147° C., 10 parts by weight of acrylic acid and 0.9 parts by weight of di-t-butyl peroxide were added dropwise separately and successively over two hours. Thereafter, the contents were further stirred over thirty minutes. Then, the contents were cooled off.

Thereafter, 48 percent by weight of sodium hydroxide aqueous solution was added to the contents with stirring so that the contents showed a pH value of 7.5. As a result, a sodium salt of water-soluble polymer aqueous solution was obtained. The powdered sodium salt of water-soluble polymer was obtained, for example, by condensing the solution.

The anti-gelation properties of the resulting sodium salt of water-soluble polymer was evaluated in the same manner as Example 1. As a result, the sodium salt of water-soluble polymer of this example showed anti-gelation properties of 0.125. The result obtained from this example is shown in Table 1.

COMPARATIVE EXAMPLE 1

In the reaction vessel used in Example 1, placed was 100 parts by weight of polyethylene glycol with a number-average molecular weight of 1,100. Under an atmosphere of nitrogen, a temperature in the reaction vessel was elevated to 145° C. with stirring to melt and mix it in the reaction vessel.

While maintaining the temperature at 145° C.~147° C., 23 parts by weight of acrylic acid and 1.2 parts by weight of di-t-butyl peroxide were added dropwise separately and successively over two hours. Thereafter, the contents were further stirred over thirty minutes. Then, the contents were cooled off.

Thereafter, 48 percent by weight of sodium hydroxide aqueous solution was added to the contents with stirring so that the contents showed a pH value of 7.5. As a result, a comparison-use water-soluble polymer of sodium salt (hereinafter referred to as a comparative polymer sodium salt) was obtained in a form of an aqueous solution. The powdered sodium salt polymer was obtained, for example, by condensing the solution.

The anti-gelation properties of the resulting comparative polymer sodium salt was evaluated in the same manner as Example 1. As a result, the sodium salt of water-soluble polymer of this example showed low anti-gelation properties of 0.248. The result obtained from this comparative example is shown in Table 1.

COMPARATIVE EXAMPLE 2

In the reaction vessel used in Example 1, placed were 100 parts by weight of monomethoxy polyethylene glycol with a number-average molecular weight of 1,100 and 14.6 parts by weight of maleic acid. Under an atmosphere of nitrogen, the contents in the reaction vessel were heated to 145° C. with stirring to melt and mix them in the reaction vessel.

While maintaining the temperature at 145° C.~147° C., 19.7 parts by weight of acrylic acid and 1.2 parts by weight of di-t-butyl peroxide were added dropwise separately and successively over two hours. Thereafter, the contents were further stirred over thirty minutes. Then, the contents were cooled off.

Thereafter, 48 percent by weight of sodium hydroxide aqueous solution was added to the contents with stirring so that the content showed a pH value of 7.5. As a result, a comparative polymer sodium salt was obtained in a form of an aqueous solution. Powdered comparative polymer sodium salt was obtained, for example, by condensing the solution.

The anti-gelation properties of the resulting comparative polymer sodium salt was evaluated in the same manner as Example 1. As a result, the sodium salt of water-soluble polymer of this example showed low anti-gelation properties of 0.176. The result obtained from this comparative example is shown in Table 1.

COMPARATIVE EXAMPLE 3

In the reaction vessel used in Example 1, placed were 100 parts by weight of monomethoxy polyethylene glycol with a number-average molecular weight of 2,000 and 20.4 parts by weight of maleic acid. Under an atmosphere of nitrogen, the contents in the reaction vessel were heated to 145° C. with stirring to melt and mix them in the reaction vessel.

While maintaining the temperature at 145° C.~147° C., 29.6 parts by weight of acrylic acid and 2.5 parts by weight of di-t-butyl peroxide were added to the contents dropwise separately and successively over two hours. Thereafter, the contents were further stirred over thirty minutes. Then, the contents were cooled off.

Thereafter, 48 percent by weight sodium hydroxide aqueous solution was added to the contents with stirring so that the contents showed a pH value of 7.5. As a result, a comparative polymer sodium salt was obtained in a form of an aqueous solution. Powdered comparative polymer sodium salt was obtained, for example, by condensing the solution.

The anti-gelation properties of the resulting comparative polymer sodium salt were evaluated in the same manner as Example 1. As a result, the sodium salt of water-soluble polymer of this comparative example showed low anti-gelation properties of 1.40. The result obtained from this comparative example is shown in Table 1.

TABLE 1

|  | ANTI-GELATION PROPERTIES |
| --- | --- |
| EXAMPLE 1 | 0.148 |
| EXAMPLE 2 | 0.125 |
| COMPARATIVE EXAMPLE 1 | 0.248 |
| COMPARATIVE EXAMPLE 2 | 0.176 |
| COMPARATIVE EXAMPLE 3 | 1.40 |

EXAMPLE 3

Respective detergencies of the detergent compositions containing the water-soluble sodium salt polymers resulting from Examples 1 and 2 and detergencies of the detergent compositions containing the comparative polymer sodium salts resulting from Comparative Examples 1 through 3 were evaluated in the following manner.

(Measuring Method)

First, an artificial sludge having a composition defined in Table 2 was prepared and dispersed in carbon tetrachloride, and white cotton cloth (hereinafter referred to as white cloth) was dipped into artificial sludge solution. Thereafter, the cloth was dried and cut into a dirty cloth of 10 cm×10 cm.

TABLE 2

ARTIFICIAL SLUDGE COMPOSITION

| COMPONENT | PERCENT BY WEIGHT |
| --- | --- |
| CLAY | 49.75 |
| MYRISTIC ACID | 8.3 |
| OLEIC ACID | 8.3 |
| TRISTEARIC ACID | 8.3 |
| TRIOLEIN | 8.3 |
| CHOLESTERIN | 4.38 |
| CHOLESTERINSTEARATE | 1.09 |
| PARAFFIN WAX (m.p. 50–52° C.) | 0.552 |
| SQUALENE | 0.552 |
| CARBON BLACK (DEFINED BY OILCHEMICAL ASSOCIATION) | 0.5 |
| WATER | 9.976 |

Using the sodium salt of water-soluble polymers resulting from the Examples 1 and 2, and comparative polymer sodium salts resulting from Comparative Examples 1 through 3, the detergent compositions having the composition shown in Table 3 (for convenience in explanations, hereinafter referred to as the detergent compositions A, B, C, D and E) were prepared.

TABLE 3

DETERGENT COMPOSITION

| COMPONENT | PERCENT BY WEIGHT |
| --- | --- |
| WATER-SOLUBLE POLYMER OF SODIUM SALT (POWDER) OR COMPARATIVE POLYMER SODIUM SALT (POWDER) | 20 |
| STRAIGHT CHAIN ALKYLBENZENE SODIUM SULFONIC ACID (C = 11.5) | 20 |
| ZEOLITE | 20 |
| POLYOXYETHYLENE ALKYL ETHER (C = 12, EO = 8) | 15 |
| SODIUM CARBONATE | 15 |
| No. 1 SODIUM SILICATE | 9.5 |
| ENZYME (PROTEASE) | 0.5 |

In Table 3, straight chain alkylbenzene sodium sulfonic acid (C=11.5) suggests straight chain alkylbenzene sodium sulfonic acid (anionic surface active agent) having straight chain alkyl group with an average number of carbon atoms of 11.5. Polyoxyethylene alkyl ether (C=12, EO=8) suggests polyoxyethylene alkyl ether (nonionic surface active agent) having an alkyl group with an average number of carbon atoms of 12 and with an average number of oxyethylene groups of 8. The sodium carbonate and No. 1 sodium silicate are alkali builders.

Using the described detergent compositions A through E, the above-defined dirty cloth was actually washed by Terg-O-Tometer available from Ueshima Seisakusho Co., Ltd., under respective washing conditions shown in Table 4.

TABLE 4

WASHING CONDITION

| TEMPERATURE | 20° C. |
| --- | --- |
| BATH RATIO | 1/60 |
| CONCENTRATION OF DETERGENT COMPOSITION | 0.3 PERCENT BY WEIGHT |
| WATER | TAP WATER |
| TERG-O-TOMETER | 10 MINUTES |

The washed dirty cloth (white cloth) (hereinafter referred to as a washed cloth) was dried, and the reflectance thereof was measured. Based on the resulting reflectance, the detergency was computed by the following formula to determine the detergency (percent).

Detergency (percent) = [(Reflectance of the Washed Cloth −

Reflectance of the Dirty Cloth) / (Reflectance of White Cloth −

Reflectance of Dirty Cloth)] × 100

The results obtained from the measurement are shown in Table 5.

TABLE 5

|  | DETERGENCY (PERCENT) |
| --- | --- |
| DETERGENT COMPOSITION A | 70.4 |
| DETERGENT COMPOSITION B | 71.2 |

TABLE 5-continued

| | DETERGENCY (PERCENT) |
|---|---|
| DETERGENT COMPOSITION C | 51.3 |
| DETERGENT COMPOSITION D | 56.5 |
| DETERGENT COMPOSITION E | 47.8 |

EXAMPLE 4

Respective detergencies of the detergent compositions containing the sodium salt of water-soluble polymers resulting from Examples 1 and 2 and detergencies of the detergent compositions containing the comparative polymer sodium salts resulting from Comparative Examples 1 through 3 were evaluated in the following manner.

(Measuring Method)

First, an artificial sludge having the same composition as that of Example 3 was prepared. Then, using white cloth, 10 cm×10 cm dirty cloth was prepared in the same manner as Example 3.

Then, using the sodium salt of water-soluble polymers resulting from Examples 1 and 2 and the comparative polymer sodium salts resulting from comparative examples 1 through 3, the detergent compositions defined in Table 6 (for convenience, hereinafter referred to as detergent compositions A', B', C', D' and E') were prepared.

TABLE 6

DETERGENT COMPOSITION

| COMPONENT | PERCENT BY WEIGHT |
|---|---|
| WATER-SOLUBLE POLYMER SODIUM SALT (POWDER) OR COMPARATIVE POLYMER SODIUM SALT (POWDER) | 5 |
| POLYOXYETHYLENE ALKYL ETHER (C = 12, EO = 8) | 89.5 |
| ETHANOL | 5 |
| ENZYME (PROTEASE) | 0.5 |

Using respective detergent compositions A' through E', the dirty cloth was washed by Terg-O-Tometer available from Ueshima Seisakusho Co., Ltd., under respective washing conditions defined in Table 7.

TABLE 7

WASHING CONDITION

| TEMPERATURE | 5° C. |
|---|---|
| BATH RATIO | 1/60 |
| DETERGENT CONCENTRATION | 0.5 PERCENT BY WEIGHT |
| WATER | TAP WATER |
| TERG-O-TOMETER | 10 MINUTES |

After being washed, respective detergencies (percent) were computed in the same manner as Example 3. The results obtained from the measurement are shown in Table 8.

TABLE 8

| | DETERGENCY (PERCENT) |
|---|---|
| DETERGENT COMPOSITION A' | 75.4 |
| DETERGENT COMPOSITION B' | 74.8 |
| DETERGENT COMPOSITION C' | 53.3 |
| DETERGENT COMPOSITION D' | 57.7 |
| DETERGENT COMPOSITION E' | 51.8 |

As is evident from Examples 1 and 2, the water-soluble polymers in accordance with the present invention show desirable range of anti-gelation properties. As is evident from Examples 3 and 4, the detergency compositions containing the water-soluble polymers in accordance with the present invention show excellent detergencies.

EXAMPLE 5

In a glass reaction vessel equipped with a thermometer, a stirrer, a nitrogen introducing tube, and a reflux condenser, placed were 200 parts by weight of polyethylene glycol (polyether compound) with a number-average molecular weight of 1,000 and 22 parts by weight of maleic acid (dicarboxylic acid monomer) as a monomer component. Under an atmosphere of nitrogen, the contents in the reaction vessel were heated to 145° C. with stirring to melt and mix them in the reaction vessel.

While maintaining the temperature at 145° C.~147° C., 50 parts by weight of acrylic acid (ethylenically unsaturated monomer) as a monomer component and 2.5 parts by weight of di-t-butyl peroxide as a polymerization initiator were added dropwise to the contents successively and separately over one hour. Thereafter, the contents were further stirred over twenty minutes. Then, the contents were cooled off.

Thereafter, 10 percent by weight of sodium hydroxide (base) aqueous solution was added with stirring in an amount sufficient for completely neutralizing the maleic acid and the acrylic acid. Thereafter, the contents were heated with stirring at reflux temperature over one hour. As a result, a water-soluble polymer of sodium salts (hereinafter referred to as a sodium salt of water-soluble polymer) was obtained in a form of an aqueous solution. Powdered sodium salt of water-soluble polymer was obtained, for example, by condensing the solution.

The calcium ion capturing ability of the resulting sodium salt of water-soluble polymer was evaluated in the below-mentioned manner.

(Measuring method)

To begin with, calcium carbonate aqueous solution with a calcium ion ($Ca^{2+}$) concentration of $10 \times 10^{-3}$ mol/L was prepared by dissolving calcium carbonate ($CaCO_3$) into water. Then, 10 mg (converted into a solid form) of the sodium salt of water-soluble polymer was placed into a 100 ml-beaker (container), and the calcium carbonate aqueous solution was added. The resulting sampling solution was stirred for 10 minutes at 25° C. using a stirrer.

After the stirring, a concentration of calcium ions of the sampling solution was evaluated using an ion analyzer (EA920 of ORION SHA) equipped with a calcium electrode (93-20 of ORION SHA). A concentration of calcium ions of the pre-stirring sampling solution was evaluated in the same manner in advance. Thus, a difference in concentration of calcium ions before and after the stirring was computed.

From the value (mol/L) obtained by the computation, the calcium ion (mg) captured by 1 g of the water-soluble polymer was computed, and was converted into the amount based on calcium carbonate (mgCaCO$_3$/g). The resulting converted value was defined to be the calcium ion capturing ability. As a result, the calcium ion capturing ability of 120 mg CaCO$_3$/g was obtained. The results obtained from the measurement are shown in Table 9. Here, the higher is the value for the calcium ion capturing ability, the more excellent is the detergency of the detergent composition containing the water-soluble polymer.

The anti-gelation properties of the resulting sodium salt of water-soluble polymer was measured in the same manner as that of Example 1. As a result, the anti-gelation properties of 0.7 was obtained. The results obtained from the measurement are shown in Table 9.

EXAMPLE 6

In the same reaction vessel as that used in Example 5, placed were 400 parts by weight of monomethoxy polyethylene glycol (polyether compound) with a number-average molecular weight of 1,000 and 22 parts by weight of maleic acid. Under an atmosphere of nitrogen, the contents in the reaction vessel were heated to 130° C. with stirring to melt and mix them in the reaction vessel.

While maintaining the temperature at 130° C.~132° C., 53 parts by weight of acrylic acid and 5 parts by weight of di-t-butyl peroxide as a polymerization initiator were added dropwise to the contents successively and separately over one hour. Thereafter, the contents were further stirred over eighty minutes. Then, the contents were cooled off.

Thereafter, 10 percent by weight of sodium hydroxide aqueous solution was added with stirring in an amount sufficient for completely neutralizing the maleic acid and the acrylic acid. Thereafter, the contents were heated with stirring at reflux temperature over one hour. As a result, a sodium salt of water-soluble polymer aqueous solution was obtained. Powdered sodium salt of water-soluble polymer was obtained, for example, by condensing the solution.

The calcium ion capturing ability and the anti-gelation properties of the resulting sodium salt of water-soluble polymer were measured in the same manner as Example 5, and the calcium ion capturing ability and the anti-gelation properties were found to be 50 mgCaCO$_3$/g and 0.2, respectively. The results obtained from this Example are shown in Table 9.

EXAMPLE 7

In the same reaction vessel as that used in Example 5, placed were 200 parts of polyethylene glycol with a number-average molecular weight of 500 and 20 parts by weight of maleic acid. Under an atmosphere of nitrogen, the contents in the reaction vessel were heated to 145° C. with stirring to melt and mix them in the reaction vessel. While maintaining the temperature at 146° C.~147° C., 20 parts by weight of acrylic acid and 5 parts by weight of di-t-butyl peroxide as a polymerization initiator were added dropwise successively and separately over one hour. Thereafter, the contents were further stirred over one hour. Then, the contents were cooled off.

Thereafter, 10 percent by weight of sodium hydroxide aqueous solution was added with stirring in an amount sufficient for completely neutralizing the maleic acid and the acrylic acid. Thereafter, the contents were heated with stirring at reflux temperature over one hour. As a result, a sodium salt of water-soluble polymer aqueous solution was obtained. The powdered sodium salt of water-soluble polymer was obtained, for example, by condensing the solution.

The calcium ion capturing ability and the anti-gelation properties of the resulting sodium salt of water-soluble polymer were measured in the same manner as Example 5, and the calcium ion capturing ability and the anti-gelation properties were found to be 70 mgCaCO$_3$/g and 0.3 respectively. The results obtained from the measurement are shown in Table 9.

EXAMPLE 8

In the same reaction vessel as that used in Example 5, placed were 200 parts by weight of polyethylene glycol with a number-average molecular weight of 500 and 20 parts by weight of maleic acid. Under an atmosphere of nitrogen, the contents in the reaction vessel were heated to 150° C. with stirring to melt and mix them in the reaction vessel. While maintaining the temperature at 150° C.~152° C., 30 parts by weight of methacrylic acid and 3 parts by weight of di-t-butyl peroxide as a polymerization initiator were added dropwise to the contents successively and separately over one hour. Thereafter, the contents were further stirred over thirty minutes. Then, the contents were cooled off.

Thereafter, 10 percent by weight of sodium hydroxide aqueous solution was added with stirring in an amount sufficient for completely neutralizing the methacrylic acid. Thereafter, the contents were heated with stirring at reflux temperature over one hour. As a result, a sodium salt of water-soluble polymer was obtained in a form of an aqueous solution. Powdered sodium salt of water-soluble polymer was obtained, for example, by condensing the solution.

The calcium ion capturing ability and the anti-gelation properties of the resulting water-soluble sodium salt powder were measured in the same manner as Example 5, and the calcium ion capturing ability and the anti-gelation properties were found to be 80 mgCaCO$_3$/g and 0.5, respectively. The results obtained from the measurement are shown in Table 9.

EXAMPLE 9

In the same reaction vessel as that used in Example 5, placed were 100 parts by weight of monomethoxy polyethylene glycol with a number-average molecular weight of 700 and 15 parts by weight of maleic acid. Under an atmosphere of nitrogen, the contents in the reaction vessel were heated to 145° C. with stirring to melt and mix them in the reaction vessel.

While maintaining the temperature at 145° C.~147° C., 15 parts by weight of acrylic acid and 3 parts by weight of di-t-butyl peroxide as a polymerization initiator were added dropwise to the content successively and separately over one hour. Thereafter, the contents were further stirred over one hour. Then, the contents were cooled off.

Thereafter, 10 percent by weight of sodium hydroxide aqueous solution was added with stirring so that the contents showed a pH value of around 11. Then, the contents were heated with stirring over one hour at reflux temperature. As a result, a sodium salt of water-soluble polymer aqueous solution was obtained. Powdered sodium salt of water-soluble polymer was obtained, for example, by condensing the solution.

The calcium ion capturing ability and the anti-gelation properties of the resulting sodium salt of water-soluble polymer were measured in the same manner as Example 5, and the calcium ion capturing ability and the anti-gelation properties were found to be 120 mgCaCO$_3$/g and 0.8, respectively. The results obtained from the measurement are shown in Table 9.

COMPARATIVE EXAMPLE 4

The same reaction was performed in the same manner as Example 5 except that an amount of acrylic acid added dropwise was altered from 50 parts by weight to 100 parts by weight, and a comparison-use water-soluble polymer of sodium salts (hereinafter referred to as a comparative polymer sodium salt) was obtained in a form of an aqueous solution. Powdered comparative polymer sodium salt was obtained, for example, by condensing the solution.

The calcium ion capturing ability and the antigelation properties of the resulting comparative polymer sodium salt were measured in the same manner as Example 5. As a result, the calcium ion capturing ability was found to be high (150 mgCaCO$_3$/g) but the anti-gelation ability was found to be low 1.7. The results obtained from the measurement are shown in Table 9.

COMPARATIVE EXAMPLE 5

The same reaction was performed in the same manner as Example 5 except that an amount of acrylic acid added dropwise was altered from 50 parts by weight to 3 parts by weight, and a comparative polymer sodium salt was obtained in a form of an aqueous solution. Powdered comparative polymer sodium salt was obtained, for example, by condensing the solution.

The calcium ion capturing ability and the anti-gelation properties of the resulting comparative sodium salt of water-soluble polymer were measured in the same manner as Example 5. As a result, the comparative polymer sodium salt was found to be inferior both in its the calcium ion capturing ability (38 mgCaCO$_3$/g) and anti-gelation ability (1.8). The results obtained from the measurement are shown in Table 9.

COMPARATIVE EXAMPLE 6

The same reaction was performed in the same manner as Example 5 except that the maleic acid was not used, and a comparative sodium salt polymer was obtained in a form of an aqueous solution. Powdered comparative polymer sodium salt was obtained, for example, by condensing the solution.

The calcium ion capturing ability and the anti-gelation properties of the resulting comparative sodium salt polymer were measured in the same manner as Example 5. As a result, the comparative polymer sodium salt was found to be inferior both in its the calcium ion capturing ability (38 mgCaCO$_3$/g) and anti-gelation ability (1.6). The results obtained from this comparative example are shown in Table 9.

COMPARATIVE EXAMPLE 7

The same reaction was performed in the same manner as Example 5 except that 200 parts by weight of polyethylene glycol (polyether compound) with a number-average molecular weight of 3,000 was used in place of 200 parts by weight of the polyethylene glycol with a number-average molecular weight of 1,000, and a comparative polymer sodium salt was obtained in a form of an aqueous solution. Powdered comparative polymer sodium salt was obtained, for example, by condensing the solution.

The calcium ion capturing ability and the anti-gelation properties of the resulting comparative sodium salt of water-soluble polymer were measured in the same manner as Example 5. As a result, the comparative polymer sodium salt was found to be inferior both in its the calcium ion capturing ability (38 mgCaCO$_3$/g) and anti-gelation ability (1.9). The results obtained from this comparative example are shown in Table 9.

TABLE 9

|  | CALCIUM ION CAPTURING ABILITY (mgCaCO$_3$/g) | ANTI-GELATION PROPERTIES |
|---|---|---|
| EXAMPLE 5 | 120 | 0.7 |
| EXAMPLE 6 | 50 | 0.2 |
| EXAMPLE 7 | 70 | 0.3 |
| EXAMPLE 8 | 80 | 0.5 |
| EXAMPLE 9 | 120 | 0.8 |
| COMPARATIVE EXAMPLE 4 | 150 | 1.7 |
| COMPARATIVE EXAMPLE 5 | 38 | 1.8 |
| COMPARATIVE EXAMPLE 6 | 38 | 1.6 |
| COMPARATIVE EXAMPLE 7 | 38 | 1.9 |

EXAMPLE 10

Respective detergencies of the detergent compositions containing the sodium salt of water-soluble polymers resulting from Examples 5 through 9 and detergencies of the detergent compositions containing the comparative polymer sodium salts resulting from Comparative Examples 4 through 7 were evaluated in the following manner.

(Measuring Method)

First, an artificial sludge having the same composition as that of Example 3 was prepared. Then, using white cloth, 10 cm×10 cm dirty cloth was prepared in the same manner as Example 3.

Then, using the sodium salt of water-soluble polymers resulting from Examples 5 through 9 and the comparative polymer sodium salts resulting from Comparative Examples 4 through 7, the detergent compositions defined in Table 6 (for convenience, hereinafter referred to as detergent compositions F, G, H, I, J, K, L, M and N) were prepared.

Using respective detergent compositions F through N, the dirty cloth was washed by Terg-O-Tometer available from Ueshima Seisakusho Co., Ltd., under respective process conditions defined in Table 10.

TABLE 10

| WASHING CONDITION | |
|---|---|
| TEMPERATURE | 5° C. |
| BATH RATIO | 1/60 |
| CONCENTRATION OF DETERGENT COMPOSITION CONCENTRATION | 0.8 PERCENT BY WEIGHT |
| WATER | TAP WATER |
| TERG-O-TOMETER | 10 MINUTES |

After being washed, respective detergencies (percent) were computed in the same manner as Example 3. The results obtained from this Comparative Example are shown in Table 11.

TABLE 11

| | DETERGENCY (PERCENT) |
|---|---|
| DETERGENT COMPOSITION F | 86.4 |
| DETERGENT COMPOSITION G | 85.2 |
| DETERGENT COMPOSITION H | 87.3 |
| DETERGENT COMPOSITION I | 85.5 |
| DETERGENT COMPOSITION J | 87.8 |
| DETERGENT COMPOSITION K | 66.7 |
| DETERGENT COMPOSITION L | 65.8 |
| DETERGENT COMPOSITION M | 63.8 |
| DETERGENT COMPOSITION N | 65.2 |

EXAMPLE 11

Respective detergencies of the detergent compositions containing the sodium salt of water-soluble polymers resulting from Examples 5 through 9 and detergencies of the detergent compositions containing the comparative polymer sodium salts resulting from Comparative Examples 4 through 7 were evaluated in the following manner.

(Measuring Method)

First, an artificial sludge having the same composition as that of Example 3 was prepared. Then, using white cloth, 10 cm×10 cm dirty cloth was prepared in the same manner as Example 3.

Then, using the sodium salt of water-soluble polymers resulting from Examples 5 through 9 and the comparative polymer sodium salts resulting from comparative examples 4 through 7, the detergent compositions defined in Table 6 (for convenience, hereinafter referred to as detergent compositions F', G', H', I', J', K', L', M' and N') were prepared.

Using respective detergent compositions F' through N', the dirty cloth was washed by Terg-O-Tometer available from Ueshima Seisakusho Co., Ltd., under respective washing conditions defined in Table 12.

TABLE 12

| WASHING CONDITION | |
|---|---|
| TEMPERATURE | 20° C. |
| BATH RATIO | 1/60 |
| CONCENTRATION OF DETERGENT COMPOSITION | 0.8 PERCENT BY WEIGHT |
| WATER | TAP WATER |
| TERG-O-TOMETER | 10 MINUTES |

After being washed, respective detergencies (percent) were computed in the same manner as Example 3. The results obtained from this measurement are shown in Table 13.

TABLE 13

| | DETERGENCY (PERCENT) |
|---|---|
| DETERGENT COMPOSITION F' | 95 |
| DETERGENT COMPOSITION G' | 94 |
| DETERGENT COMPOSITION H' | 95 |
| DETERGENT COMPOSITION I' | 93 |
| DETERGENT COMPOSITION J' | 95 |
| DETERGENT COMPOSITION K' | 68 |
| DETERGENT COMPOSITION L' | 65 |
| DETERGENT COMPOSITION M' | 67 |
| DETERGENT COMPOSITION N' | 66 |

As is evident from Examples 5 through 9, the water-soluble polymers in accordance with the present invention show optimal range of calcium ion capturing ability and optimal range of anti-gelation properties. As is evident from Examples 10 and 11, the detergency compositions containing the water-soluble polymers in accordance with the present invention show excellent detergencies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

POSSIBLE INDUSTRIAL APPLICATIONS OF THE PRESENT INVENTION

The water-soluble polymer in accordance with the present invention has optimal specific range of calcium ion capturing ability and optimal specific range of anti-gelation properties, and are suitably applied, for example, as a detergent builder as it shows excellent detergency and satisfactory performances. The water-soluble polymer is suitably used as a detergent builder, a dispersant of an inorganic substance that is not easily dissolvable to water and of an organic substance, an anti-scale agent, a fiber processing agent, etc. A detergent composition containing the water-soluble polymer of the present invention shows excellent detergencies.

What is claimed is:

1. A water-soluble polymer prepared by a polymerization reaction of a polyether compound with a monomer component including an ethylenically unsaturated monomer, said water-soluble polymer having anti-gelation properties of not more than 0.16.

2. The water-soluble polymer as set forth in claim 1, wherein:

said polyether compound includes polyalkylene glycol.

3. The water-soluble polymer as set forth in claim 1, wherein:

said ethylenically unsaturated monomer includes (meth) acrylic acid.

4. The water-soluble polymer as set forth in claim 1, wherein:

said monomer component includes an ethylenically unsaturated dicarboxylic acid monomer.

5. The water-soluble polymer as set forth in claim 4, wherein:

said ethylenically unsaturated dicarboxylic monomer includes at least one compound selected from the group consisting of maleic acid, fumaric acid, and maleic anhydride.

6. A water-soluble polymer obtained by a polymerization reaction of a polyether compound with a number-average molecular weight of not less than 200 containing at least 50 mole percent of ethylene oxide as a unit structure with 5 percent by weight to 25 percent by weight of a monomer component composed of 40 mole percent to 90 mole percent of ethylenically unsaturated monomer and 10 mole percent to 60 mole percent of ethylenically unsaturated dicarboxylic acid monomer.

7. The water-soluble polymer as set forth in claim 6, wherein:

said polyether compound further includes at least one unit structure selected from the group consisting of propylene oxide and butylene oxide.

8. The water-soluble polymer as set forth in claim 6, wherein:

at least some of terminal hydrogen groups of said polyether compound are esterified.

9. The water-soluble polymer as set forth in claim 6, wherein:
   said ethylenically unsaturated monomer includes (meth) acrylic acid.

10. The water-soluble polymer as set forth in claim 6, wherein:
    said ethylenically unsaturated dicarboxylic monomer includes at least one compound selected from the group consisting of maleic acid, fumaric acid, and maleic anhydride.

11. A method of manufacturing a water-soluble polymer, comprising the step of:
    carrying out a polymerization reaction of a polyether compound with a number-average molecular weight of not less than 200 containing at least 50 mole percent of ethylene oxide as a unit structure with 5 percent by weight to 25 percent by weight of a monomer component composed of 40 mole percent to 90 mole percent of ethylenically unsaturated monomer and 10 mole percent to 60 mole percent of ethylenically unsaturated dicarboxylic acid monomer.

12. The method of manufacturing the water-soluble polymer as set forth in claim 11, wherein:
    said step of carrying out the polymerization reaction is performed in a presence of organic peroxide.

13. The method of manufacturing the water-soluble polymer as set forth in claim 11, wherein:
    said step of carrying out the polymerization reaction is performed substantially without a solvent.

14. The method of manufacturing the water-soluble polymer as set forth in claim 11, further comprising the step of:
    mixing not less than a half of said ethylenically unsaturated dicarboxylic acid monomer into said polyether compound prior to carrying out said step of carrying out the polymerization reaction.

15. The method of manufacturing the water-soluble polymer as set forth in claim 11, wherein:
    said step of carrying out the polymerization reaction includes the step of adding at least a part of the monomer component dropwise.

16. The method of manufacturing the water-soluble polymer as set forth in claim 11, wherein:
    said step of carrying out the polymerization reaction includes the step of adding at least a part of the polymerization initiator dropwise.

17. The method of manufacturing the water-soluble polymer as set forth in claim 11, wherein:
    said step of carrying out the polymerization reaction includes the step of separately adding the monomer component and the polymerization initiator dropwise simultaneously.

18. The method of manufacturing a water-soluble polymer as set forth in claim 11, wherein:
    the polymerization reaction is carried out at temperature not less than 120° C.

19. A detergent builder, comprising:
    a water soluble polymer obtained by a polymerization reaction of a polyether compound with a monomer component containing ethylenically unsaturated monomer, said water-soluble monomer having an anti-gelation property of not more than 0.16.

20. The detergent builder as set forth in claim 19, wherein:
    said monomer component includes ethylenically unsaturated dicaroboxylic acid monomer.

21. A detergent builder comprising:
    a water-soluble polymer obtained by a polymerization reaction of a polyether compound having a number-average molecular weight of not less than 200 including not less than 50 mole percent of ethylene oxide as a unit structure with from 5 percent by weight to 25 percent by weight of a monomer component composed of from 40 mole percent to 90 mole percent of ethylenically unsaturated monomer and from 10 mole percent to 60 mole percent of ethylenically unsaturated dicarboxylic acid monomer.

22. A water-soluble polymer obtained by a polymerization reaction of a polyether compound with a monomer component containing an ethylenically unsaturate monomer, said water-soluble polymer having a calcium ion capturing ability of not less than 40 mgCaCO$_3$/g and an anti-gelation property of not more than 1.5.

23. The water-soluble polymer as set forth in claim 22, wherein:
    said calcium ion capturing ability is not more than 130 mgCacO$_3$/g.

24. The water-soluble polymer as set forth in claim 22, wherein:
    said anti-gelation property is not less than 0.1 and not more than 1.0.

25. The water-soluble polymer as set forth in claim 22, wherein:
    said polyether compound includes polyalkylene glycol.

26. The water-soluble polymer as set forth in claim 22, wherein:
    said ethylenically unsaturated monomer includes (meth) acrylic acid.

27. The water-soluble polymer as set forth in claim 22, wherein:
    said monomer component includes an ethylenically unsaturated dicarboxylic acid monomer.

28. The water-soluble polymer as set forth in claim 22, wherein:
    said ethylenically unsaturated dicarboxylic monomer includes at least one compound selected from the group consisting of maleic acid, fumaric acid, and maleic anhydride.

29. A water-soluble polymer obtained by a polymerization reaction of a polyether compound with a number-average molecular weight of not less than 250 and not more than 1,900 containing at least 80 mole percent of ethylene oxide as a unit structure with 25 percent by weight to 40 percent by weight of a monomer component composed of 50 mole percent to 80 mole percent of ethylenically unsaturated monomer and 20 mole percent to 50 mole percent of ethylenically unsaturated dicarboxylic acid monomer.

30. The water-soluble polymer as set forth in claim 29, wherein:
    said polyether compound further includes at least one unit structure selected from the group consisting of propylene oxide and butylene oxide.

31. The water-soluble polymer as set forth in claim 29, wherein:
    a part of all of terminal hydrogen groups of said polyether compound is esterified.

32. The water-soluble polymer as set forth in claim 29, wherein:
    said ethylenically unsaturated monomer includes (meth) acrylic acid.

33. The water-soluble polymer as set forth in claim 29, wherein:
    said ethylenically unsaturated dicarboxylic monomer includes at least one compound selected from the group consisting of maleic acid, fumaric acid, and maleic anhydride.

34. A manufacturing method of a water-soluble polymer, comprising the step of:

(a) carrying out a polymerization reaction of a polyether compound with a number-average molecular weight of not less than 250 and not more than 1,900 containing at least 50 mole percent of ethylene oxide as a unit structure with 25 percent by weight to 40 percent by weight of a monomer component composed of 50 mole percent to 80 mole percent of ethylenically unsaturated monomer and 20 mole percent to 50 mole percent of ethylenically unsaturated dicarboxylic acid monomer.

35. The manufacturing method of a water-soluble polymer as set forth in claim 34, wherein:

said step (a) is carried out in a presence of organic peroxide.

36. The manufacturing method of a water-soluble polymer as set forth in claim 34, wherein:

said step (a) is performed substantially without a solvent.

37. The manufacturing method of a water-soluble polymer as set forth in claim 34, further comprising the step of:

(b) mixing at least a half of said ethylenically unsaturated dicarboxylic acid monomer in said polyether compound prior to carrying out said step (a).

38. The manufacturing method of a water-soluble polymer as set forth in claim 34, wherein:

said step (a) includes a step of adding at least a part of said monomer component dropwise.

39. The manufacturing method of a water-soluble polymer as set forth in claim 34, wherein:

said step (a) includes a step of adding at least a part of said polymerization initiator dropwise.

40. The manufacturing method of a water-soluble polymer as set forth in claim 34, wherein:

said step (a) includes a step of separately said monomer component and said polymerization initiator dropwise simultaneously.

41. The manufacturing method of a water-soluble polymer as set forth in claim 34, wherein:

said step (a) is carried out at temperature not less than 120° C.

42. A detergent builder, comprising:

a water soluble polymer obtained by a polymerization reaction of a polyether compound with a monomer component containing ethylenically unsaturated monomer, said water-soluble monomer having a calcium ion capturing ability of not less than 40 mgCaCO$_3$/g and an anti-gelation property of not more than 1.5.

43. The detergent builder as set forth in claim 42, wherein:

said calcium ion capturing ability is not more than 130 mgCaCO$_3$/g.

44. The detergent builder as set forth in claim 42, wherein:

said monomer component includes an ethylenically unsaturated dicarboxylic acid monomer.

45. A detergent builder comprising:

a water-soluble polymer obtained by a polymerization reaction of a polyether compound with a number-average molecular weight of not less than 250 and not more than 1,900 containing at least 80 mole percent of ethylene oxide as a unit structure with 25 percent by weight to 40 percent by weight of a monomer component composed of 50 mole percent to 80 mole percent of ethylenically unsaturated monomer and 20 mole percent to 50 mole percent of ethylenically unsaturated dicarboxylic acid monomer.

46. The method of manufacturing the water-soluble polymer as set forth in claim 11, wherein:

said polyether compound further includes at least one unit structure selected from the group consisting of propylene oxide and butylene oxide.

47. The method of manufacturing the water-soluble polymer as set forth in claim 11, wherein:

at least some of terminal hydrogen groups of said polyether compound are esterified.

48. The method of manufacturing the water-soluble polymer as set forth in claim 11, wherein:

said ethylenically unsaturated monomer includes (meth) acrylic acid.

49. The method of manufacturing the water-soluble polymer as set forth in claim 11, wherein:

said ethylenically unsaturated dicarboxylic monomer includes at least one compound selected from the group consisting of maleic acid, fumaric acid and maleic anhydride.

50. The manufacturing method of a water-soluble polymer as set forth in claim 34, wherein:

said polyether compound further includes at least one unit stucture selected from the group consisting of propylene oxide and butylene oxide.

51. The manufacturing method of a water-soluble polymer as set forth in claim 34, wherein:

a part or all of terminal hydrogen groups of said polyether compound is esterified.

52. The manufacturing method of a water-soluble polymer as set forth in claim 34, wherein:

said ethylenically unsaturated monomer includes (meth) acrylic acid.

53. The manufacturing method of a water-soluble polymer as set forth in claim 34, wherein:

said ethylenically unsaturated dicarboxylic monomer includes at least one compound selected from the group consisting of maleic acid, fumaric acid and maleic anhydride.

* * * * *